United States Patent
Jeong et al.

(10) Patent No.: US 11,137,523 B2
(45) Date of Patent: Oct. 5, 2021

(54) POLARIZER PROTECTIVE FILM, POLARIZING PLATE, AND DISPLAY DEVICE COMPRISING SAME

(71) Applicant: SKC CO., LTD., Suwon-si (KR)

(72) Inventors: Dawoo Jeong, Suwon-si (KR); Jang Won Lee, Suwon-si (KR); Young Min Heo, Suwon-si (KR); Ho Chun Kang, Seoul (KR); Sechul Lee, Bucheon-si (KR)

(73) Assignee: SKC CO., LTD., Suwon-si (KR)

( * ) Notice: Subject to any disclaimer, the term of this patent is extended or adjusted under 35 U.S.C. 154(b) by 197 days.

(21) Appl. No.: 15/778,942

(22) PCT Filed: Nov. 25, 2016

(86) PCT No.: PCT/KR2016/013697
§ 371 (c)(1),
(2) Date: May 24, 2018

(87) PCT Pub. No.: WO2017/091031
PCT Pub. Date: Jun. 1, 2017

(65) Prior Publication Data
US 2018/0356564 A1    Dec. 13, 2018

(30) Foreign Application Priority Data

Nov. 27, 2015  (KR) ........................ 10-2015-0167738

(51) Int. Cl.
| | |
|---|---|
| G02B 1/14 | (2015.01) |
| B29C 48/00 | (2019.01) |
| B29C 48/08 | (2019.01) |
| B29C 48/92 | (2019.01) |
| B29D 11/00 | (2006.01) |

(Continued)

(52) U.S. Cl.
CPC ............ *G02B 1/14* (2015.01); *B29C 48/0018* (2019.02); *B29C 48/08* (2019.02); *B29C 48/92* (2019.02);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,766,532 A | * | 6/1998 | Peiffer | ................. B29C 55/005 |
| | | | | 264/173.15 |
| 2007/0298243 A1 | * | 12/2007 | Suzuki | .................... C08K 3/32 |
| | | | | 428/328 |

(Continued)

FOREIGN PATENT DOCUMENTS

| | | | |
|---|---|---|---|
| JP | 2001279002 A | * | 10/2001 |
| JP | 2009-288395 A | | 12/2009 |

(Continued)

OTHER PUBLICATIONS

Japanese Patent Office; Communication dated May 28, 2019, issued in the counterpart Application No. 2018-527203.

(Continued)

*Primary Examiner* — Anthony J Frost
(74) *Attorney, Agent, or Firm* — Sughrue Mion, PLLC

(57) ABSTRACT

Embodiments relate to a protective film for a polarizer, a polarizing plate, and a display device comprising the same. The protective film for a polarizer according to the embodiments is improved in mechanical strength and minimized in rainbow strains by minimizing the difference in the orientation angle between the center and the edge of the film while generating a difference in the strengths in the longitudinal/transverse directions of the film. Hence, it can be advantageously used as a protective film for a polarizer.

10 Claims, 1 Drawing Sheet

(51) Int. Cl.
| | |
|---|---|
| B29C 55/14 | (2006.01) |
| B32B 27/08 | (2006.01) |
| B32B 27/36 | (2006.01) |
| G02B 5/30 | (2006.01) |
| G02F 1/1335 | (2006.01) |
| B29L 31/34 | (2006.01) |
| G02F 1/1333 | (2006.01) |
| B29K 67/00 | (2006.01) |
| B29L 11/00 | (2006.01) |

(52) U.S. Cl.
CPC ........ B29C 55/143 (2013.01); B29D 11/0073 (2013.01); B29D 11/00788 (2013.01); B32B 27/08 (2013.01); B32B 27/36 (2013.01); G02B 5/3025 (2013.01); G02F 1/133528 (2013.01); B29C 2948/92704 (2019.02); B29D 11/00644 (2013.01); B29K 2067/003 (2013.01); B29K 2995/0034 (2013.01); B29K 2995/0053 (2013.01); B29K 2995/0077 (2013.01); B29L 2011/0066 (2013.01); B29L 2031/3475 (2013.01); B32B 2307/42 (2013.01); B32B 2307/518 (2013.01); B32B 2307/54 (2013.01); B32B 2307/584 (2013.01); G02F 1/133331 (2021.01)

(56) References Cited

U.S. PATENT DOCUMENTS

2009/0197020 A1* 8/2009 Kim .......................... C08J 5/18
428/1.31

2013/0100378 A1* 4/2013 Murata .................... G02B 1/14
349/61
2014/0016244 A1* 1/2014 Monno ...................... C08J 5/18
361/323
2014/0293197 A1 10/2014 Shin et al.
2016/0048057 A1 2/2016 Sekiguchi et al.
2016/0062012 A1 3/2016 Shin et al.

FOREIGN PATENT DOCUMENTS

| | | |
|---|---|---|
| JP | 2011-53271 A | 3/2011 |
| JP | 2011-213770 A | 10/2011 |
| JP | 2013-139151 A | 7/2013 |
| JP | 2014-066942 A | 4/2014 |
| JP | 2014-124845 A | 7/2014 |
| JP | 2014-219438 A | 11/2014 |
| JP | 2015-111206 A | 6/2015 |
| JP | 2015-111207 A | 6/2015 |
| KR | 10-2013-0040227 A | 4/2013 |
| KR | 10-2014-0074838 A | 6/2014 |
| KR | 10-2014-0108693 A | 9/2014 |
| KR | 10-2016-0028594 A | 3/2016 |

OTHER PUBLICATIONS

International Search Report for PCT/KR2016/013697, dated Jan. 18, 2017.

Korean Intellectual Property Office; Communication dated Feb. 28, 2019 issued in counterpart application No. 10-2018-7014658.

* cited by examiner

POLARIZER PROTECTIVE FILM, POLARIZING PLATE, AND DISPLAY DEVICE COMPRISING SAME

TECHNICAL FIELD

Embodiments relate to a protective film for a polarizer, a polarizing plate, and a display device comprising the same.

BACKGROUND ART

The advent of the information age has prompted development and commercialization of various display devices including liquid crystal displays (LCD), plasma display panels (PDP), electrophoretic displays (ELD), and the like. Display devices for indoor uses have become larger in size and thinner in thickness, and portable display devices for outdoor uses have become smaller in size and lighter in weight. Various optical films have been employed in order to further enhance the functions of such displays.

Materials used for these optical films are generally required to satisfy such properties as a high transmittance, optical isotropy, defectless surfaces, high heat resistance, high moisture resistance, high flexibility, high surface hardness, low shrinkage, good processability, and the like, depending on the types of display.

In the manufacture of a polarizing plate, a film made of triacetyl cellulose (TAC), which has such characteristics as high transmittance, optical isotropy, defectless surfaces, and the like, is commonly employed as a protective film on one side or both sides of a polarizer made of polyvinyl alcohol to protect the polarizer. However, a triacetyl cellulose film is disadvantageous in that it is expensive, does not have a variety of sources, and is vulnerable to moisture.

Accordingly, in recent years, protective films of various materials capable of substituting triacetyl cellulose films have been developed. For example, it has been proposed that a cycloolefin polymer (COP) film, an acrylic film, a polyester film, or the like is used alone or in combination. Thus, Japanese Patent No. 4962661 discloses a technique that provides a polyester film stretched four times or more in the transverse direction (i.e., TD direction) to be used as a protective film for a polarizer. It, however, has the problem that the stretching in the transverse/longitudinal directions may not be uniform. There is also a limit to the reduction in thickness of the film.

Therefore, the present inventors have endeavored to resolve the aforementioned problems associated with the prior art and have completed the present invention by discovering that a protective film for a polarizer, which is excellent in mechanical strength without rainbow strains, by minimizing the difference in the orientation angle between the center and the edge of the film while generating a difference in the strengths in the longitudinal/transverse directions of the film.

DISCLOSURE OF INVENTION

Technical Problem

Accordingly, embodiments aim to provide a protective film for a polarizer, which is excellent in mechanical strength without rainbow strains, by minimizing the difference in the orientation angle between the center and the edge of the film while generating a difference in the strengths in the longitudinal/transverse directions of the film, and a polarizing plate comprising the protective film, and a display device comprising the polarizing plate.

Solution to Problem

According to an embodiment, there is provided a protective film for a polarizer, which is a uniaxially or biaxially stretched polyester film that has been stretched by 4.15 times or more in the transverse direction (TD) and by 2.0 times or less in the longitudinal direction (MD), and which has a tensile strength in the longitudinal direction of 9.0 to 18 $kgf/mm^2$, a tensile strength in the transverse direction of 24 to 35 $kgf/mm^2$, a ratio of the tensile strength in the longitudinal direction to the tensile strength in the transverse direction of 0.25 to 0.6, and an in-plane retardation of 3,000 nm or more.

Further, according to an embodiment, there is provided a polarizing plate, which comprises a polarizer layer; and the protective film for a polarizer adjacent to at least one of the upper and lower sides of the polarizer layer.

In addition, according to an embodiment, there is provided a display device, which comprises a display panel; and a polarizing plate disposed on at least one of the upper and lower sides of the display panel, wherein the polarizing plate comprises a polarizer layer and a protective film for a polarizer adjacent to at least one of the upper and lower sides of the polarizer layer.

Further, according to an embodiment, there is provided a process for preparing a protective film for a polarizer, which comprises casting a polyester resin to produce an unstretched sheet; stretching the unstretched sheet by 2.0 times or less in the longitudinal direction; and stretching the unstretched sheet by 4.15 times or more in the transverse direction, wherein the stretched film has a tensile strength in the longitudinal direction of 9.0 to 18 $kgf/mm^2$, a tensile strength in the transverse direction of 24 to 35 $kgf/mm^2$, a ratio of the tensile strength in the longitudinal direction to the tensile strength in the transverse direction of 0.25 to 0.6, and an in-plane retardation of 3,000 nm or more.

Advantageous Effects of Invention

The protective film for a polarizer according to the embodiments is excellent in mechanical strength without rainbow strains, by minimizing the difference in the orientation angle between the center and the edge of the film while generating a difference in the strengths in the longitudinal/transverse directions of the film.

Hence, it can be advantageously used as a protective film for a polarizer.

BEST MODE FOR CARRYING OUT THE INVENTION

Figure 1:
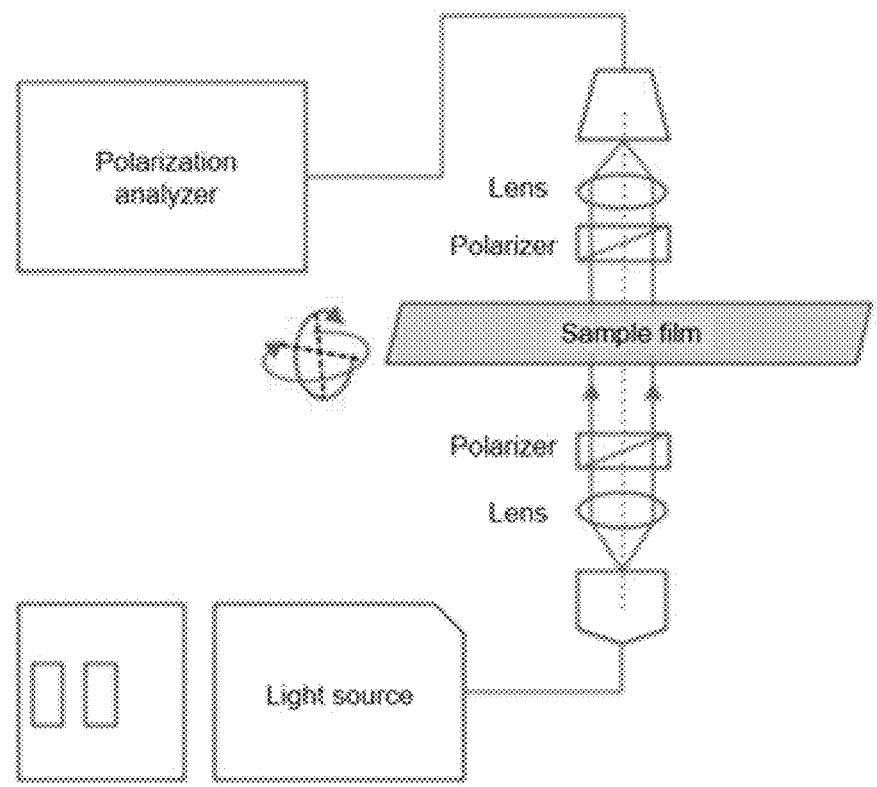
FIG. 1 is a schematic diagram showing the system for measuring an orientation angle as used in Test Example 1.

Hereinafter, the present invention will be described in more detail.

An embodiment provides a protective film for a polarizer, which is a uniaxially or biaxially stretched polyester film that has been stretched by 4.15 times or more in the transverse direction (TD) and by 2.0 times or less in the longitudinal direction (MD), and which has a tensile strength in the longitudinal direction of 9.0 to 18 kgf/mm$^2$, a tensile strength in the transverse direction of 24 to 35 kgf/mm$^2$, a ratio of the tensile strength in the longitudinal direction to the tensile strength in the transverse direction of 0.25 to 0.6, and an in-plane retardation of 3,000 nm or more.

The protective film for a polarizer is a monolayer film that comprises a polyester resin, which film may have been stretched by 4.15 times or more in the transverse direction and by 2.0 times or less in the longitudinal direction.

For example, it may have been stretched by 4.15 times or more, or 4.15 times to 4.5 times in detail, in the transverse direction. It may not have been stretched in the longitudinal direction or may have been stretched by 2.0 times or less, 1.5 times or less in detail, or 1.0 to 1.3 times in more detail.

The protective film stretched at the above-mentioned ratios may have a deviation in the orientation angle of ±2.5 degrees or less in its entire width. In detail, it may have a deviation in the orientation angle of ±0.5 to ±2.5 degrees. If the protective film has a deviation in the orientation angle within the above range, it is possible to prevent a color distortion phenomenon such as rainbow stains.

In order to improve the mechanical strength of the protective film, the following method may be used.

Specifically, a method of increasing the stretching load (i.e., stress) may be used at the time of stretching. If the stretching temperature is lowered to reduce the amount of preheating applied to the protective film when the film is stretched in the longitudinal direction and/or in the transverse direction, the stress applied thereto increases and the tendency of crystals to be oriented increases, whereby the mechanical strength of the film can be improved.

In addition, the protective film may be prepared at a low stretching speed. The protective film may have an improved tensile strength and an improved modulus in the transverse and longitudinal directions due to such a low stretching speed.

Further, the protective film may have a low deviation in the retardation due to such a low stretching speed. For example, the film may have a deviation in the retardation of 400 nm or less.

The protective film has a tensile strength in the longitudinal direction of 9.0 to 18 kgf/mm$^2$ and a tensile strength in the transverse direction of 24 to 35 kgf/mm$^2$ The ratio of the tensile strength in the longitudinal direction to the tensile strength in the transverse direction may be 0.25 to 0.6, 0.25 to 0.4 in detail, or 0.25 to 0.35 in more detail. If the protective film has tensile strengths and a tensile strength ratio within the above ranges, the mechanical strength thereof can be improved.

In addition to the above, a method of crystallizing the film by elevating the thermal treatment temperature (or TMS temperature) upon heat setting after the stretching may be used. If the TMS temperature is elevated, the crystal growth in the film is accelerated and the amount of crystals is increased as well, so that the mechanical strength of the film can be improved.

Further, the protective film may have an improved tensile strength and an improved modulus in the transverse and longitudinal directions by shortening the thermal treatment time upon heat setting after the stretching. In addition, the protective film may have a low deviation in the retardation due to such a short thermal treatment time.

The film may have a ratio of the modulus in the longitudinal direction to the modulus in the transverse direction of 0.4 to 0.6, or 0.4 to 0.55 in detail.

The film may have a modulus in the longitudinal direction of 225 kgf/mm$^2$ to 290 kgf/mm$^2$, or 225 kgf/mm$^2$ to 270 kgf/mm$^2$ in detail. The film may have a modulus in the transverse direction of 480 kgf/mm$^2$ to 560 kgf/mm$^2$, 480 kgf/mm$^2$ to 550 kgf/mm$^2$ in detail, or 500 kgf/mm$^2$ to 550 kgf/mm$^2$ in more detail.

The protective film may have an in-plane retardation (Re) of about 3,000 nm or more, or 3,500 nm or more in detail. In more detail, the protective film may have an in-plane retardation of about 7,000 nm or more. In more detail, the protective film may have an in-plane retardation of about 7,500 nm or more.

The protective film may have a thickness of about 30 to 300 μm, about 30 to 200 μm in detail, or 40 to 200 μm in more detail.

Further, an embodiment provides a process for preparing a protective film for a polarizer, which comprises casting a polyester resin to produce an unstretched sheet; stretching the unstretched sheet by 2.0 times or less in the longitudinal direction; and stretching the unstretched sheet by 4.15 times or more in the transverse direction, wherein the stretched film has a tensile strength in the longitudinal direction of 9.0 to 18 kgf/mm$^2$, a tensile strength in the transverse direction of 24 to 35 kgf/mm$^2$, a ratio of the tensile strength in the longitudinal direction to the tensile strength in the transverse direction of 0.25 to 0.6, and an in-plane retardation of 3,000 nm or more.

Specifically, a resin that can be used as a raw material for a film such as a polyester resin, for example, a polyethylene terephthalate resin is melt extruded to produce an unstretched sheet, and the unstretched sheet is stretched in the transverse direction and in the longitudinal direction, to thereby prepare a protective film.

More specifically, the resin that can be used as a raw material for a film such as a polyester resin, for example, a polyethylene terephthalate resin may be directly prepared by carrying out an esterification reaction and a polymerization reaction of a diol component such as ethylene glycol and a dicarboxylic acid component such as terephthalic acid. Or a commercially available resin may be purchased for use. The resin may be melt extruded and then cooled to produce an unoriented sheet. The unoriented sheet may be stretched by 2.0 times or less in the longitudinal direction, stretched in the transverse direction, for example, by 4.15 times or more, and heat set to produce a protective film. In such event, the unstretched sheet may be stretched in the transverse direction immediately after it has been stretched in the longitudinal direction without any special step.

The melt extrusion may be carried out at a temperature of Tm+30 to Tm+60° C. If the melt extrusion is carried out within the above-mentioned temperature range, the melting can be smoothly performed, and the viscosity of the extrudate can be properly maintained. Further, the cooling may be carried out at a temperature of 30° C. or less, specifically 15 to 30° C.

The stretching temperature may be in the range of Tg+5 to Tg+50° C. The lower the Tg, the better the extrudability, but breakage may occur. In particular, the stretching temperature may be in the range of Tg+10 to Tg+40° C. for the improvement of brittleness.

In the stretching step in the transverse direction, the stretching speed in the transverse direction may be 350%/min to 800%/min. In detail, the stretching speed in the transverse direction may be about 350%/min to about 770%/min. In such event, the stretching temperature may be about 85° C. to about 100° C.

The stretched film may be subjected to heat setting. The film may be relaxed in the longitudinal direction and/or in the transverse direction after the heat setting is initiated. The heat setting temperature may be 200° C. to 210° C. The heat setting time may be about 6 seconds to about 13 seconds.

According to the preparation process described above, it is possible to prepare a protective film, which has a proper thickness and an in-plane retardation of 3,000 nm or more, so that it has improved mechanical strength without rainbow strains. In addition, the protective film may comprise various additives such as ordinary electrostatic charge, antistatic, antiblocking agents, and other inorganic lubricants within the ranges that do not impair the effect of this embodiment.

In addition, an embodiment provides a polarizing plate, which comprises a polarizer layer; and a protective film for a polarizer adjacent to at least one of the upper and lower sides of the polarizer layer, wherein the protective film for a polarizer is a uniaxially or biaxially stretched polyester film that has been stretched by 4.15 times or more in the transverse direction (TD) and by 2.0 times or less in the longitudinal direction (MD), and the protective film for a polarizer has a tensile strength in the longitudinal direction of 9.0 to 18 kgf/mm$^2$, a tensile strength in the transverse direction of 24 to 35 kgf/mm$^2$, a ratio of the tensile strength in the longitudinal direction to the tensile strength in the transverse direction of 0.25 to 0.6, and an in-plane retardation of 3,000 nm or more.

As the polarizing plate comprises the protective film for a polarizer as described above, it can have improved optical, mechanical, and thermal characteristics.

Further, an embodiment provides a display device, which comprises a display panel; and a polarizing plate disposed on at least one of the upper and lower sides of the display panel, wherein the polarizing plate comprises a polarizer layer; and a protective film for a polarizer adjacent to at least one of the upper and lower sides of the polarizer layer, the protective film for a polarizer is a uniaxially or biaxially stretched polyester film that has been stretched by 4.15 times or more in the transverse direction (TD) and by 2.0 times or less in the longitudinal direction (MD), and the protective film for a polarizer has a tensile strength in the longitudinal direction of 9.0 to 18 kgf/mm$^2$, a tensile strength in the transverse direction of 24 to 35 kgf/mm$^2$, a ratio of the tensile strength in the longitudinal direction to the tensile strength in the transverse direction of 0.25 to 0.6, and an in-plane retardation of 3,000 nm or more.

As described above in detail, the protective film for a polarizer according to the embodiments is improved in mechanical strength and minimized in rainbow strains by minimizing the difference in the orientation angle between the center and the edge of the film while generating a difference in the strengths in the longitudinal/transverse directions of the film. Hence, it can be advantageously used as a protective film for a polarizer and can be employed in such a displace device as liquid crystal displays, organic electroluminescent displaces, and the like.

MODE FOR THE INVENTION

Hereinafter, the present invention is explained in detail by the following Examples. The following Examples are intended to further illustrate the present invention. The scope of the invention is not limited thereto.

Example 1

A polyethylene terephthalate resin (consisting of 100% by mole of ethylene glycol and 100% by mole of terephthalic acid with an IV of 0.61 dl/g, SKC) was melt extruded through an extruder at about 280° C. and then cooled on a casting roll at about 25° C. to prepare an unstretched sheet. The unstretched sheet was preheated at 100° C. and stretched by about 1.2 times in the longitudinal direction and by 4.16 times in the transverse direction in sequence at 90° C. In such event, the stretching speed in the transverse direction was about 396.2%/min. Then, the uniaxially stretched sheet was heat set at about 210° C. for about 0.21 minute to prepare a single-layered film having a thickness of 188 μm.

Examples 2 to 5

Single-layered films were each prepared in the same manner as in Example 1, except that the stretch ratios in the longitudinal and transverse directions and the thickness of the final film were changed as shown in Table 1 below.

Comparative Example 1

A single-layered film was prepared in the same manner as in Example 1, except that the stretch ratios in the longitudinal and transverse directions and the thickness of the final film were changed as shown in Table 1 below.

Comparative Example 2

The SRF product from Toyobo was used.

Test Example (1) Evaluation of Orientation Angle

The orientation angle of a film was measured using the orientation angle measurement system as illustrated in FIG. 1, and the deviation in the measured orientation angles is shown in Table 3 below.

(2) Evaluation of Modulus and Tensile Strength

The films prepared in Examples 1 to 5 and those prepared in Comparative Examples 1 and 2 (i.e., sample films) were measured for the modulus in the longitudinal direction and that in the transverse direction in accordance with KS B 5521. The ratio of the modulus in the longitudinal direction to the modulus in the transverse direction was also calculated. In addition, a load was applied to the films of the Examples and the Comparative Examples to measure the tensile strength by dividing the maximum load when the film was stretched by the original cross-sectional area of the film. The results are shown in Table 2 below.

(3) Evaluation of In-Plane Retardation

The refractive indices (nx and ny) in two mutually perpendicular directions and the refractive index (nz) in the thickness direction of a film were measured with an Abbe refractometer (NAR-4T available from Atago Co., Ltd.;

measurement wavelength of 589 nm). The thickness d (nm) of the film was measured with an electronic micrometer (Millitron 1245D available from feinpruf millitron), which was converted to the nm unit. The absolute value (|nx−ny|) of the difference in the refractive indices in the two perpendicular directions was obtained and multiplied by the thickness d (nm) to obtain the in-plane retardation (Re) as the product (Δnxy×d). The results are shown in Table 3 below.

(4) Observation of Rainbow Strains

Figure 2:
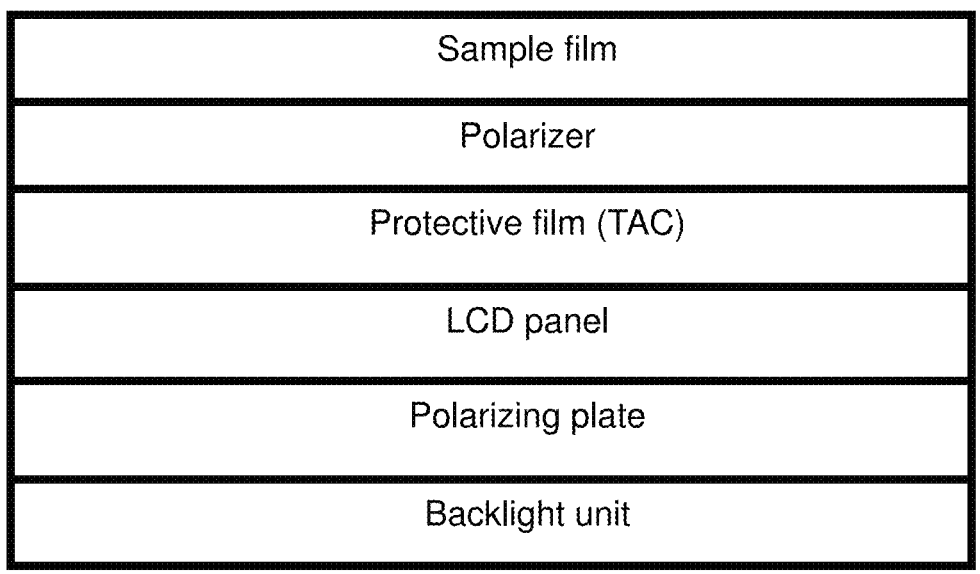
FIG. 2 is a schematic diagram showing a film employed in a display device for the purpose of checking whether rainbow stains are observed in Test Example 4.

The protective films of Examples 1 to 5 and those of Comparative Examples 1 and 2 (i.e., sample films) were each laminated on one side of a polarizer made of PVA and iodine such that the absorption axis of the polarizer and the main orientation axis of the film were perpendicular to each other. Then, a TAC film (80 μm, Fuji Film Co., Ltd.) was laminated on the opposite side to thereby prepare a polarizing plate. The polarizing plate was mounted on the light emitting side of a liquid crystal display device that employed a white LED as a light source (NSPW500CS, Nichia Corporation) consisting of light emitting elements in which a blue light emitting diode and an yttrium-aluminum-garnet yellow fluorescent were combined. Here, the sample film was placed on the viewer side. The liquid crystal display had a polarizing plate having two TAC films as a protective film for a polarizer and disposed on the light incident side of the liquid crystal cells (see FIG. 2). The presence or absence of rainbow stains (i.e., polarization unevenness) was checked by observing the polarizing plate of the liquid crystal display device with the naked eye from the front and oblique directions. The results are shown in Table 3 below.

(5) Evaluation of the Surface Cut in TD

The protective films for a polarizer were each cut in the transverse direction using a cutter. Thereafter, the cut surface was visually observed through a microscope. If burrs were formed on the cut surface, it was evaluated as poor. If no burr was formed on the cut surface, it was evaluated as good. The results are shown in Table 3 below.

TABLE 1

| | Thickness (μm) | Stretching ratio (times) MD | Stretching ratio (times) TD | Stretching temp. (° C.) | Stretching speed (%/min) | Heat set temp. (° C.) | Heat set time (min) |
|---|---|---|---|---|---|---|---|
| Ex. 1 | 188 | 1.2 | 4.16 | 90.0 | 396.2 | 210.0 | 0.21 (12.6 sec) |
| Ex. 2 | 145 | 1.3 | 4.34 | 85.0 | 535.8 | 200.0 | 0.18 (10.8 sec) |
| Ex. 3 | 100 | 1.3 | 4.44 | 85.0 | 716.1 | 200.0 | 0.14 (8.4 sec) |
| Ex. 4 | 100 | 1.5 | 4.44 | 85.0 | 727.9 | 200.0 | 0.13 (7.8 sec) |
| Ex. 5 | 80 | 1.3 | 4.42 | 85.0 | 762.0 | 200.0 | 0.13 (7.8 sec) |
| C. Ex. 1 | 100 | 3.1 | 4.25 | 140 | 1100 | 220 | 0.50 (30 sec) |
| C. Ex. 2 | 80 | — | — | — | — | — | — |

TABLE 2

| | Modulus (kgf/mm$^2$) | | | Tensile strength (kgf/mm$^2$) | | |
|---|---|---|---|---|---|---|
| | MD | TD | MD/TD | MD | TD | MD/TD |
| Ex. 1 | 228.2 | 500.8 | 0.46 | 9.2 | 28.4 | 0.32 |
| Ex. 2 | 255.7 | 517.2 | 0.49 | 9.8 | 32.3 | 0.30 |
| Ex. 3 | 252.9 | 532.1 | 0.48 | 9.1 | 30.8 | 0.30 |
| Ex. 4 | 264.3 | 528.9 | 0.50 | 9.8 | 32.8 | 0.30 |
| Ex. 5 | 266.8 | 544.6 | 0.49 | 10.0 | 34.1 | 0.29 |
| C. Ex. 1 | 382.7 | 435.7 | 0.88 | 19.6 | 26.0 | 0.75 |
| C. Ex. 2 | 222.1 | 583.0 | 0.38 | 8.2 | 24.7 | 0.33 |

TABLE 3

| | Deviation in orientation angle (±deg.) +750/−750 mm | In-plane retardation (Re) | Deviation in retardation in TD +750/−750 mm | Polarization unevenness | Surface condition cut in TD |
|---|---|---|---|---|---|
| Ex. 1 | 1.1 | 17563.0 | ±68 | None | Poor |
| Ex. 2 | 1.2 | 15232.0 | ±89 | None | Good |
| Ex. 3 | 1.3 | 11052.0 | ±91 | None | Good |
| Ex. 4 | 1.6 | 10523.0 | ±151 | None | Good |
| Ex. 5 | 1.3 | 7929.0 | ±95 | None | Good |
| C. Ex. 1 | 25 to 30 | 4691.0 | ±1473 | Strongly visible | Good |
| C. Ex. 2 | 2.5 | 8480.0 | ±432 | None | Poor |

(+750/−750 mm: based on the entire width of a film of 1,500 mm)

As confirmed from the results shown in Tables 2 and 3 above, all of the films prepared in Examples 1 to 5 had an excellent tensile strength, a ratio of the tensile strength in the longitudinal direction to the tensile strength in the transverse direction of 0.4 or less, a deviation in the orientation angle of less than 2.5 degrees, and a high in-plane retardation of 3,000 nm or more, and rainbow stains were hardly observed. In contrast, the film prepared in Comparative Example 1 had a high mechanical strength but a large deviation in the orientation angle and a low in-plane retardation, and rainbow stains were strongly visible. In addition, the film of Comparative Example 2 had a low mechanical strength, and burrs were observed on the surface cut in the TD. Therefore, it was confirmed that the protective films for a polarizer prepared in the Examples not only minimize the occurrence of rainbow stains but also greatly improves the mechanical strength thereof.

The invention claimed is:

1. A protective film for polarizer, which is a biaxially stretched polyester film having a stretch ratio in transverse direction (TD) of 4.15 or more and a stretch ratio in longitudinal direction (MD) of 1.2 to 2.0,
which has a tensile strength in the longitudinal direction of 9.0 to 18 kgf/mm$^2$, a tensile strength in the transverse direction of 24 to 35 kgf/mm$^2$, a ratio of the tensile strength in the longitudinal direction (MD) to the tensile strength in the transverse direction (TD) of 0.25 to 0.35, and an in-plane retardation of 3,000 nm or more,
wherein the protective film has a modulus in the longitudinal direction (MD) of 225 kgf/mm$^2$ to 290 kgf/mm$^2$ and a modulus in the transverse direction (TD) of 480 kgf/mm$^2$ to 560 kgf/mm$^2$, a ratio of the modulus in the longitudinal direction (MD) to the modulus in the transverse direction (TD) of 0.4 to 0.6,
wherein the protective film has a deviation in the orientation angle of ±2.5 degrees or less in its entire width, and
wherein the protective film shows a change in the in-plane retardation by less than 400 nm across the width of the film.

2. The protective film for polarizer of claim 1, wherein the in-plane retardation is 7,500 nm or more.

3. A polarizing plate, which comprises:
a polarizer layer; and
a protective film for polarizer adjacent to at least one of the upper and lower sides of the polarizer layer,
wherein the protective film for polarizer is a biaxially stretched polyester film having a stretch ratio in transverse direction (TD) of 4.15 or more and a stretch ratio in longitudinal direction (MD) of 1.2 to 2.0,
wherein the protective film for polarizer has a tensile strength in the longitudinal direction (MD) of 9.0 to 18 kgf/mm$^2$, a tensile strength in the transverse direction (TD) of 24 to 35 kgf/mm$^2$, a ratio of the tensile strength in the longitudinal direction (MD) to the tensile strength in the transverse direction (TD) of 0.25 to 0.35, and an in-plane retardation of 3,000 nm or more,
wherein the protective film for polarizer has a modulus in the longitudinal direction (MD) of 225 kgf/mm$^2$ to 290 kgf/mm$^2$ and a modulus in the transverse direction (TD) of 480 kgf/mm$^2$ to 560 kgf/mm$^2$, a ratio of the modulus in the longitudinal direction (MD) to the modulus in the transverse direction (TD) of 0.4 to 0.6,
wherein the protective film for polarizer has a deviation in the orientation angle of ±2.5 degrees or less in its entire width, and
wherein the protective film for polarizer shows a change in the in-plane retardation by less than 400 nm across the width of the film.

4. The polarizing plate of claim 3, wherein the protective film shows a change in the in-plane retardation by less than 400 nm across the width of the protective film.

5. The polarizing plate of claim 3, wherein the protective film has a ratio of the tensile strength in the longitudinal direction (MD) to the tensile strength in the transverse direction (TD) of 0.25 to 0.4.

6. The polarizing plate of claim 5, wherein the film has an in-plane retardation of 7,500 nm or more.

7. A display device, which comprises:
a display panel; and
a polarizing plate disposed on at least one of the upper and lower sides of the display panel,
wherein the polarizing plate comprises a polarizer layer; and a protective film for polarizer adjacent to at least one of the upper and lower sides of the polarizer layer,
wherein the protective film for polarizer is a biaxially stretched polyester film having a stretch ratio in transverse direction (TD) of 4.15 times or more and a stretch ratio in longitudinal direction (MD) of 1.2 to 2.0,
the protective film for polarizer has a tensile strength in the longitudinal direction (MD) of 9.0 to 18 kgf/mm$^2$, a tensile strength in the transverse direction (TD) of 24 to 35 kgf/mm$^2$, a ratio of the tensile strength in the longitudinal direction (MD) to the tensile strength in the transverse direction (TD) of 0.25 to 0.35, and an in-plane retardation of 3,000 nm or more,
wherein the protective film for polarizer has a modulus in the longitudinal direction (MD) of 225 kgf/mm$^2$ to 290 kgf/mm$^2$ and a modulus in the transverse direction (TD) of 480 kgf/mm$^2$ to 560 kgf/mm$^2$, a ratio of the modulus in the longitudinal direction (MD) to the modulus in the transverse direction (TD) of 0.4 to 0.6,
wherein the protective film for polarizer has a deviation in the orientation angle of ±2.5 degrees or less in its entire width, and
wherein the protective film for polarizer shows a change in the in-plane retardation by less than 400 nm across the width of the film.

8. A process for preparing a protective film for polarizer according to claim 1, which comprises:
casting a polyester resin to produce an unstretched sheet;
stretching the unstretched sheet by 1.2 to 2.0 times in its longitudinal direction (MD) or stretching the unstretched sheet by 4.15 times or more in its transverse direction (TD) to give an uniaxially stretched polyester film in either longitudinal direction (MD) or transverse direction (TD); and
stretching the uniaxially stretched polyester film in the other direction to give biaxially stretched polyester film in both longitudinal direction (MD) and transverse direction (TD),
wherein the biaxially stretched film has a tensile strength in the longitudinal direction (MD) of 9.0 to 18 kgf/mm$^2$, a tensile strength in the transverse direction (TD) of 24 to 35 kgf/mm$^2$, a ratio of the tensile strength in the longitudinal direction (MD) to the tensile strength in the transverse direction (TD) of 0.25 to 0.35, an in-plane retardation of 3,000 nm or more;
wherein the biaxially stretched film has a modulus in the longitudinal direction (MD) of 225 kgf/mm$^2$ to 290 kgf/mm$^2$ and a modulus in the transverse direction (TD) of 480 kgf/mm$^2$ to 560 kgf/mm$^2$; a ratio of the modulus in the longitudinal direction to the modulus in the transverse direction of 0.4 to 0.6; and a deviation in the orientation angle of ±2.5 degrees or less in its entire width, and wherein the protective film for polarizer shows a change in the in-plane retardation by less than 400 nm across the width of the protective film.

9. The process for preparing a protective film for polarizer of claim 8, which further comprises heat setting the biaxially stretched film, wherein temperature of the heat setting is 200° C. to 210° C., and duration of the heat setting is 6 seconds to 13 seconds.

10. The process for preparing a protective film for polarizer of claim 8, wherein in the stretching step in the transverse direction (TD), the stretching speed in the transverse direction (TD) is 350%/min to 800%/min.

* * * * *